US008383252B2

(12) United States Patent
Miwa et al.

(10) Patent No.: US 8,383,252 B2
(45) Date of Patent: Feb. 26, 2013

(54) RARE EARTH MAGNET AND ITS PRODUCTION METHOD

(75) Inventors: Masashi Miwa, Tokyo (JP); Jun Hagiwara, Tokyo (JP)

(73) Assignee: TDK Corporation, Tokyo (JP)

( * ) Notice: Subject to any disclaimer, the term of this patent is extended or adjusted under 35 U.S.C. 154(b) by 287 days.

(21) Appl. No.: 12/237,802

(22) Filed: Sep. 25, 2008

(65) Prior Publication Data

US 2009/0087672 A1 Apr. 2, 2009

(30) Foreign Application Priority Data

Sep. 28, 2007 (JP) ................................ P2007-255326
Sep. 25, 2008 (JP) ................................ P2008-246534

(51) Int. Cl.
*B32B 15/00* (2006.01)

(52) U.S. Cl. .................................................... 428/692.1

(58) Field of Classification Search .................. 428/469, 428/692.1, 692.2; 252/62.55
See application file for complete search history.

(56) References Cited

U.S. PATENT DOCUMENTS

| | | | | |
|---|---|---|---|---|
| 5,840,375 | A * | 11/1998 | Katsumi et al. | 427/600 |
| 2004/0261909 | A1* | 12/2004 | Hamada | 148/302 |
| 2006/0234085 | A1* | 10/2006 | Nakano | 428/692.1 |
| 2007/0160863 | A1* | 7/2007 | Hamada et al. | 428/546 |
| 2009/0212893 | A1 | 8/2009 | Hamada et al. | |

FOREIGN PATENT DOCUMENTS

| | | | |
|---|---|---|---|
| CN | 1934660 | A | 3/2007 |
| JP | 62-152108 | | 7/1987 |
| JP | A-03-123009 | | 5/1991 |
| JP | A-11-251121 | | 9/1999 |
| JP | 2000182813 | A * | 6/2000 |
| JP | A-2000-182813 | | 6/2000 |
| JP | A-2002-329629 | | 11/2002 |
| JP | A-2003-007556 | | 1/2003 |
| JP | 2006049864 | A * | 2/2006 |
| JP | A-2006-49864 | | 2/2006 |

OTHER PUBLICATIONS

Derwent: Okonogi et al. (1988-332825).*

* cited by examiner

*Primary Examiner* — Holly Rickman
*Assistant Examiner* — Linda Chau
(74) *Attorney, Agent, or Firm* — Oliff & Berridge, PLC

(57) ABSTRACT

The present invention has aimed to provide a method which is capable of producing a rare earth magnet having a protective layer that can provide a sufficient water resistance. The present invention provides a method for producing a rare earth magnet comprising a magnet body containing a rare earth element and a protective layer with high water resistance formed on the surface of the magnet body, the method comprising a first step in which a zinc compound soluble in an alkaline solution is dissolved in an alkali silicate solution to prepare a treatment solution, a second step in which the treatment solution is attached on the surface of the magnet body, and a third step in which the treatment solution attached on the magnet body surface is cured to form a protective layer comprising the cured product of the treatment solution.

3 Claims, 2 Drawing Sheets

RARE EARTH MAGNET AND ITS PRODUCTION METHOD

BACKGROUND OF THE INVENTION

1. Field of the Invention

The present invention relates to a rare earth magnet and a production method therefor.

2. Related Background Art

The rare earth magnets containing rare earth elements, although having high magnetism, are rather poor in corrosion resistance as they contain a readily oxidizable rare earth element as a principal ingredient. Therefore, the rare earth magnets are mostly provided with a protective layer formed by resin coating or plating on the surface of the magnet body containing a rare earth element. Recently, demand is also increasing for the technique that enables formation of a protective layer that can exhibit corrosion resistance higher than a certain level more easily and at a lower cost than conventional techniques, for the cases where corrosion resistance of a magnet body itself has been improved or where there is no need for such high corrosion resistance as required in the past.

As an example of the rare earth magnets having such a protective layer, there is known an anti-corrosive rare earth magnet having a flaky fine powder/alkali silicate composite film obtained by heating a film formed from a treatment solution containing flaky fine powder of a specific metal and an alkali silicate (See Japanese Patent Laid-Open No. 2006-49864).

SUMMARY OF THE INVENTION

Studies are underway in recent years on the use of the rare earth magnets having high performance under various conditions. Also, resistance to water (water-resistance) has increasingly been required for the rare earth magnet, However, the studies conducted by the present inventors revealed that the corrosion-resistant rare earth magnets having the conventional flaky fine powder/alkali silicate composite coating film, although exhibiting corrosion resistance under the normal conditions, are still unsatisfactory in respect of water resistance.

The present invention has been achieved in view of such circumstances, and it envisions to provide a method which is capable of producing a rare earth magnet having a protective layer that can provide a sufficient water resistance.

In order to attain the above object, the present invention provides a method for producing a rare earth magnet comprising a magnet body containing a rare earth element and a protective layer formed on the surface of the magnet body, the method comprising a first step in which a zinc compound soluble in an alkaline solution is dissolved in an alkali silicate solution to prepare a treatment solution, a second step in which the treatment solution is attached on the surface of the magnet body, and a third step in which the treatment solution attached on the surface of the magnet body is cured to form a protective layer composed of the cured product of the treatment solution.

According to the method for producing a rare earth magnet of the present invention, it is possible to form efficiently a protective layer of a form where a zinc element is dispersed uniformly in a coating film comprising an alkali silicate (so-called "soluble glass"). Such a protective layer possesses high resistance to water and is capable of well inhibiting water penetration. Therefore, the rare earth magnet produced by the method of the present invention may be provided with excellent water resistance.

The above-mentioned prior art flaky fine powder/alkali silicate composite film may take a structure having zinc contained in the composite film at first glance, when the material of the flaky fine powder is zinc. However, the studies conducted by the present inventors revealed that since such a composite coating film contains zinc in the form of flaky fine powder, there may arise the cases where the film thickness becomes non-uniform to lower water resistance, or an adverse effect is given to the electronic instruments incorporated with the rare earth magnet due to dropout of the particles or other causes.

In contrast, in the present invention, since a treatment solution having a zinc compound dissolved therein is used as described above, the protective layer formed contains zinc in the state of an atom or a state close to the size of the atom (for example, a state of a molecular of zinc compound). Consequently, the rare earth magnet obtained according to the present invention has sufficient water resistance as it has a protective layer with uniform thickness, and also the adverse effect to the electronic instruments due to dropout of the particles, etc., hardly occurs. Further, according to the present invention, it is possible to reduce the thickness of the protective layer as it contains no particles, and this protective layer, though small in thickness, possesses sufficient water resistance. Accordingly, in the case of the rare earth magnet obtained according to the present invention, as its protective layer can be thinned within the specified range of size, it becomes possible to correspondingly enlarge the magnet body, and this enables easy acquisition of high-grade magnetic properties while acquiring sufficient water resistance.

Also, in the 1st step of the method of the present invention, after a zinc compound is incorporated in an alkali silicate solution, the solution is preferably stirred for 24 hours or more. This ensures dissolution of the zinc compound in the treatment solution, making it even easier to achieve the effect of the present invention.

The present invention also provides the rare earth magnet suitably obtained by the method for producing a rare earth magnet of the present invention mentioned above. Namely, the rare earth magnet of the present invention comprises a magnet body containing a rare earth element and a protective layer formed on the surface of the magnet body, wherein the protective layer contains an alkali silicate, and zinc and/or a zinc compound is uniformly dispersed in the protective layer.

The rare earth magnet of the present invention having such constitution has the protective layer where zinc is contained in a coating film mainly composed of an alkali silicate in the state of zinc atom or a zinc compound. This protective layer possesses high resistance to water and is capable of well inhibiting water penetration as mentioned above. Therefore, excellent water resistance can be obtained, and high-grade magnetic properties also can be obtained because the protective layer can be thinned.

According to the present invention, it is possible to provide a rare earth magnet that has a protective layer imparting sufficient water resistance even with a small thickness, and is capable of exhibiting excellent magnetic properties and provide its production method.

DESCRIPTION OF THE PREFERRED EMBODIMENTS

Figure 1:
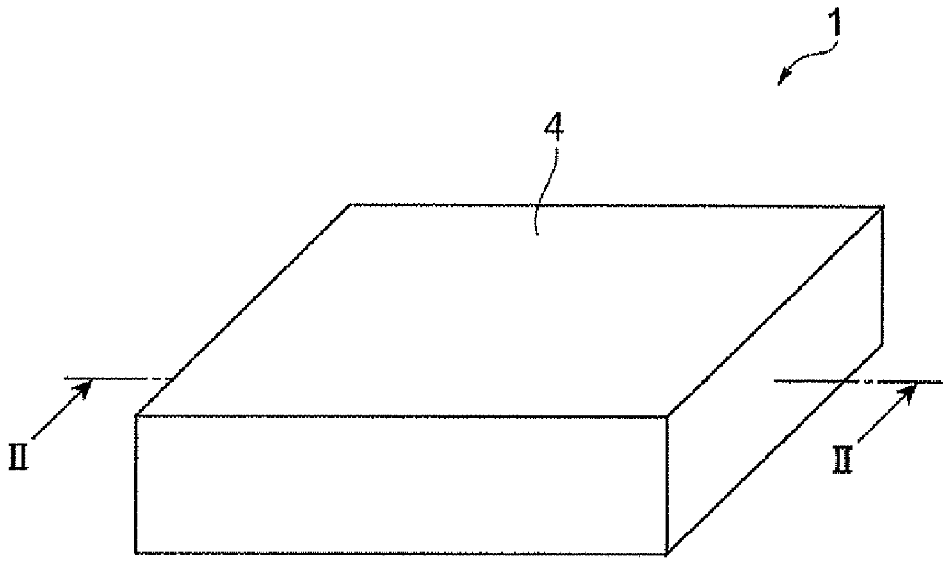
FIG. 1 is a perspective view showing an example of the rare earth magnet obtained according to the production method of the present invention.

Hereafter, the preferred embodiments of the present invention will be described with reference to the accompanying drawings in which identical reference numerals are used to indicate identical parts or elements throughout, and the repetition of the same explanations is avoided.

First, the method for producing a rare earth magnet in a preferred embodiment of the present invention is described.

In producing a rare earth magnet, a magnet body is formed in the first place. The magnet body is a permanent magnet containing a rare earth element, and it is possible to use the magnet materials of the compositions known as rare earth magnet with no specific restrictions. The rare earth elements that can be contained in the magnet body are scandium (Sc), yttrium (Y) and lanthanoid elements belonging to the group III of the long form of periodic table. The lanthanoid elements include, for example, lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

The constituent material of the magnet body includes those containing in combination the rare earth elements described above and the transition elements other than the rare earth elements. As the rare earth element, at least one element selected from the group consisting of Nd, Sm, Dy, Pr, Ho and Tb is preferred. It is more preferable to contain, along with these elements, at least one element selected from the group consisting of La, Ce, Gd, Er, Eu, Tm, Yb and Y.

As the transition elements other than the rare earth elements, at least one element selected from the group consisting of iron (Fe), cobalt (Co), titanium (Ti), vanadium (V), chromium (Cr), manganese (Mn), nickel (Ni), copper (Cu), zirconium (Zr), niobium (Nb), molybdenum (Mo), hafnium (Hf), tantalum (Ta), and tungsten (W) is preferred, of which Fe and/or Co are more preferable.

More specifically, the R—Fe—B and R—Co materials can be mentioned as examples of the magnet body constituent materials. In the R—Fe—B system, R is preferably a rare earth element mainly composed of Nd. In the R—Co system, R is preferably a rare earth element mainly composed of Sm.

As the constituent material of the magnet body according to the present invention, the materials of the R—Fe—B system are especially preferable. Use of an R—Fe—B system material for the magnet body provides excellent magnetic properties and is also helpful for enhancing the corrosion resistance improving effect by formation of the protective layer.

The R—Fe—B magnet body has the main phase of a substantially tetragonal crystal structure, and is of a structure in which a rare earth rich phase with a high rate of rare earth element and a boron-rich phase with a high rate of boron atoms are provided at the grain boundary of the main phase. These rare earth rich phase and boron rich phase are non-magnetic phases having no magnetism. Such non-magnetic phases are usually contained in an amount of 0.5 to 50 vol % in the constituent material of the magnet. The particle size of the main phase is usually about 1 to 100 μm.

In these R—Fe—B materials, the content of the rare earth element is preferably 8 to 40 atomic %. If the rare earth element content is less than 8 atomic %, the crystal structure of the main phase takes almost the same crystal structure as alpha iron, resulting in a lowering tendency of coercivity (iHc). On the other hand, if the rare earth element content exceeds 40 atomic %, the rare earth rich phase is formed in excess, causing a reduction of residual magnetic flux density (Br).

The content of Fe preferably falls in the range of 42 to 90 atomic %. If the Fe content is less than 42 atomic %, Br tends to decrease, and if it exceeds 90 atomic %, iHc tends to lower. The content of B is preferably in the range of 2 to 28 atomic %. If the B content is less than 2 atomic %, a rhombohedral structure is likely to form, which tends to reduce coercivity. If the B content exceeds 28 atomic %, the boron-rich phase is formed in excess, which tends to lessen Br.

In the constituent material described above, part of Fe in the R—Fe—B system may be substituted with Co. Partial substitution of Fe with Co makes it possible to improve temperature characteristics without deteriorating the magnetic properties. In this case, the amount of substitution with Co is preferably defined to an extent that does not exceed the content of Fe. If the Co content exceeds the Fe content, there is a tendency for the magnetic properties of the magnet body 2 to deteriorate.

Also, part of B in the above constituent material may be substituted with an element such as carbon (C), phosphorus (P), sulfur (S) or copper (Cu). Such partial substitution of B serves for facilitating the production of the magnet body and also contributes to reduction of the production cost. Substitution of these elements is preferably limited to an amount that does not substantially affect the magnetic properties of the magnet body and is preferably not more tan 4 atomic % based on the total amount of the constituent atoms.

Further, in order to realize additional improvement of iHc and reduction of the production cost, it is possible to add, besides the above-mentioned constituents, other elements such as aluminum (Al), titanium (Ti), vanadium (V), chromium (Cr), manganese (Mn), bismuth (Bi), niobium (Nb), tantalum (Ta), molybdenum (Mo), tungsten (W), antimony (Sb), germanium (Ge), tin (Sn), zirconium (Zr), nickel (Ni), silicon (Si), gallium (Ga), copper (Cu), and hafnium (Hf). The amount of these elements to be added is also preferably defined to fall within the range where they give no adverse effect to the magnetic properties of the product, preferably an amount which is not more than 10 atomic % based on the total amount of the constituent atoms. There are also the elements, such as oxygen (O), nitrogen (N), carbon (C) and calcium (Ca), which are inevitably mixed in the composition in the course of the production process. No problem is posed, however, if these elements are contained in an amount not more than about 3 atomic % based on the total amount of the constituent atoms.

The magnet body can be produced by, for instance, a powder metallurgical method. According to this method, first an alloy having a desired composition is made by a known alloy production process such as casting or strip casting. This alloy is crushed to a particle size of 10 to 100 μm by a coarse crusher such as jaw crusher, Brown mill or stamp mill, and then further pulverized to a particle size of 0.5 to 5 μm by a pulverizer such as jet mill or attritor. The thus obtained powder is molded in a magnetic field with a field strength of preferably 600 kA/m or higher under a pressure of 0.5 to 5 t/cm$^2$ to obtain a molded product.

Then the obtained molded product is calcined preferably under the conditions of an inert gas atmosphere or in vacuo, a calcining temperature of 1,000 to 1,200° C. and a calcining time of 0.5 to 10 hours. After calcination, the obtained sintered body may be quenched. Further, this sintered body may be subjected, as required, to a heat treatment in an inert gas atmosphere or in vacuo, at 500 to 900° C. for 1 to 5 hours and worked into a desired shape (practical shape) by cutting or polishing, thereby obtaining a magnet body.

The thus obtained magnet body may be properly cleansed to remove surface ruggedness or contaminants adhering to the surface. A preferred example of cleansing is pickling using an acid solution. Pickling is capable of dissolving away surface ruggedness and contaminants on the magnet body surface to allow for easier obtainment of a magnet body having a smooth surface.

Nitric acid is preferable as the acid used for pickling. Generally, a non-oxidative acid such as hydrochloric acid and sulfuric acid is often used for plating of general steel materials. However, in case the workpiece contains rare earth elements like the magnet body, when these acids are used for the treatment there is a possibility that hydrogen generated by the acid may be occluded in the surface of the magnet body, and the occluded portion may become degraded to cause generation of a large volume of powdery undissolved matter. This powdery undissolved matter may become a cause of surface roughening after the surface treatment and other defects or troubles such as imperfect adhesion. It is therefore preferable not to contain a non-oxidative acid such as those mentioned above in the treatment solution used for pickling. In this embodiment of the present invention, it is therefore preferable to use nitric acid which is an oxidative acid with little possibility of generating hydrogen.

In case of using nitric acid for pickling, its concentration in the treatment solution is preferably 1 N or below, more preferably 0.5 N or below. When the nitric acid concentration is too high, the dissolving speed of the magnet body rises excessively to make it difficult to control the amount of dissolution, and particularly in the case of bulk treatment like barrel processing, variation tends to enlarge to make it hardly possible to maintain dimensional precision of the product. On the other hand, a too low nitric acid concentration tends to cause a lack in the amount of dissolution. Thus, the nitric acid concentration is preferably adjusted to be 1 N or below, more preferably 0.5 to 0.05 N, Preferably, the amount of dissolution of Fe at the end of the treatment is around 1 to 10 g/l.

The amount of dissolution of the magnet body surface by such pickling is set at 5 μm or above, preferably 10 to 15 μm, in terms of average thickness from the surface. This makes it possible to almost perfectly eliminate the denatured or oxidized layer formed in the working of magnet body surface and allows for formation of the desired protective layer at higher precision in the protective layer forming step which is described later.

Also, after removing the treatment solution used for pickling by washing with water, the magnet body is preferably subjected to ultrasonic cleaning to perfectly get rid of small quantities of undissolved matter left on the surface or residual acid substances. This ultrasonic cleaning can be carried out in pure water almost free of chlorine ions which may cause rusting of the magnet body surface or in an alkaline solution or the like. Also, ultrasonic cleaning may be followed by washing with water as required.

In producing a rare earth magnet, a magnet body is formed in the manner described above, and a treatment solution to attached on the surface of this magnet body is prepared. This treatment solution can be obtained by dissolving, in an alkali silicate solution, a zinc compound soluble in an alkaline solution. In this treatment solution preparation step, a zinc compound is dissolved at least partly in the treatment solution, with the degree of dissolution being adjusted so that the obtained treatment solution will have a turbidity not higher than 10 NTU, preferably not higher than 20 NTU, as measured by a turbidimeter (e.g. Model 2100P by Hack Company). The zinc compound can be well dissolved in the thus prepared treatment solution, and a protective layer with high corrosion resistance can be formed.

Particularly in the present embodiment, it is preferable that the zinc compound be completely dissolved in the alkali silicate solution in the preparation of the treatment solution. Here, "complete dissolution" of the zinc compound means a state where the above-defined turbidity is 100 NTU or below. In this state, there is little possibility of the particles of zinc or a zinc compound being contained in the protective layer, enabling obtainment of even higher water resistance while facilitating thinning of the protective layer.

The alkali silicates that can be contained in the treatment solution include, for instance, lithium silicate, sodium silicate, potassium silicate, and ammonium silicate. These alkali silicates may be used alone or as a mixture of two or more of them. Particularly a mixture of sodium silicate and lithium silicate is preferred as it can form a protective layer with high corrosion resistance.

The zinc compounds suited for use in the present invention are ones which are soluble in an alkaline solution, particularly those with a pH of around 10 to 11. These zinc compounds can be completely dissolved in the above mentioned alkali silicate solutions at normal temperature and are particularly suited for use in the rare earth magnet production method of the present invention. Examples of such zinc compounds may include zinc sulfate, zinc borate, basic zinc carbonate, zinc acetate, the zinc chloride, and zinc gluconate. These compounds can be used in the form of hydrates.

The alkali silicate solution used in the preparation of the treatment solution is preferably one which has an alkali silicate concentration of 1 to 50 mass %, more preferably 5 to 40 mass %, Using such an alkali silicate solution, it is possible to form a protective layer with excellent corrosion resistance and to dissolve the zinc compound well.

Also, the content of the zinc compound in the treatment solution is preferably 0.001 to 0.05 moles, more preferably 0.002 to 0.02 moles, per mole of silicon in the alkali silicate. This makes it possible to implement uniform dispersion of zinc in the protective layer and easier obtainment of excellent corrosion resistance. When the content of the zinc compound is too low, corrosion resistance of the rare earth magnet tends to lower, and when it is too high, stability of the treatment solution tends to deteriorate.

Further, in the preparation of the treatment solution, after the zinc compound has been added to the alkali silicate solution, the mixture is preferably stirred for 24 hours or more, more preferably 48 hours or more. This ensures positive dissolution of the zinc compound in the alkali silicate solution. When the stirring time is less than 24 hours, dissolution of the zinc compound may prove insufficient, making it unable to provide desired water resistance. Even better dissolution of the zinc compound can be attained when the temperature in this operation is set at 10 to 50° C.

Next, the treatment solution prepared in the manner described above is attached on the surface of the magnet body. Attachment of the treatment solution can be effected, for instance, by dropwise addition or spray of the treatment solution on the magnet body surface or by immersing the magnet body in the treatment solution. Immersion of the magnet body in the treatment solution is preferred for effecting uniform attachment of the treatment solution over the whole surface of the magnet body. Specifically, for such attachment of the treatment solution, it is preferable to employ a dip spin coating method in which the magnet body is immersed in the solution, then picked up and turned to shake off the excess treatment solution.

After the treatment solution is attached on the surface of the magnet body as described above, the treatment solution attached on the surface is cured. This curing of the treatment solution is essentially the curing of the alkali silicate contained in the treatment solution, and such curing is induced as the solvent water is removed from the alkali silicate solution.

The treatment solution can be cured, for instance, by heating the magnet body attached with the treatment solution. The heating temperature is preferably set at 100 to 500° C., more preferably 120 to 350° C. The heating time is preferably one minute to ten hours, more preferably five minutes to one hour. When the heating temperature is too low or the heating time is too short, sufficient curing may fail to take place, making it unable to obtain high water resistance. Also, a too high heating temperature or a too long heating time is undesirable as it tends to cause deterioration of the magnetic properties of the product.

In this way, the treatment solution attached on the surface of the magnet body is cured and a protective layer is formed by the cured product of the treatment solution on the surface of the magnet body, thus providing a rare earth magnet as a preferred embodiment of the present invention.

Figure 2:
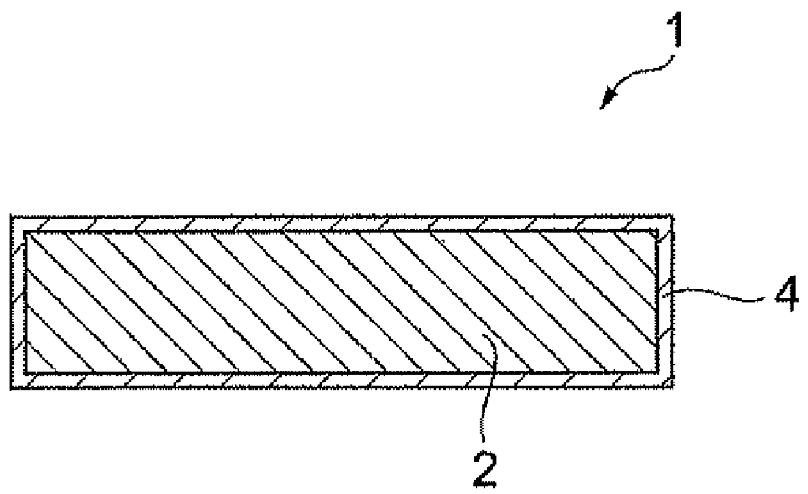
FIG. 2 is a schematic illustration of a section along the line II-II of the rare earth magnet shown in FIG. 1.

A structural example of the thus obtained rare earth magnet is explained below. FIG. 1 is a perspective view showing an example of the rare earth magnet obtained according to the production method of the present invention. FIG. 2 is a schematic illustration of a section along the line II-II of the rare earth magnet shown in FIG. 1. As illustrated in these figures, a rare earth magnet 1 in the present embodiment of the present invention comprises a magnet body 2 and a protective layer 4 covering the surface of the magnet body 2, and generally it has the shape of a rectangular parallelepiped.

In this rare earth magnet 1, the magnet body 2 has the above-described composition. The protective layer 4 is a layer formed as a result of curing of the treatment solution prepared by dissolving a zinc compound in an alkali silicate solution. This protective layer 4 is, for instance, of a structure in which zinc is dispersed as a single metal element or in the form of a zinc compound used as base material in a glassy film made of an alkali silicate. In formation of the protective layer 4, because of use of a treatment solution having a zinc compound dissolved therein almost completely, zinc is contained in the form of atom or a form close to the size of atom.

In the protective layer 4, since the protective layer 4 is formed from the treatment solution prepared by dissolving a zinc compound, zinc and/or a zinc compound is uniformly dispersed in a glassy film made of an alkali silicate. Here, "zinc and/or zinc compound is uniformly dispersed" shows the state where zinc and/or zinc compound do not exist only in the specific domain in the protective layer 4, but exist over the whole. For example, the state that, when the section of the protective layer 4 is analyzed by TEM-EDS, the domain formed by gathering zinc and/or a zinc compound does not have a width of 10 nm or more even if it is the largest case corresponds to "zinc and/or zinc compound is uniformly dispersed".

In the rare earth magnet 1, zinc or a zinc compound is contained in the protective layer in an amount (in ratio of the zinc element) of preferably 0.001 to 0.05 moles, more preferably 0.002 to 0.02 moles, per mole of silicon in the alkali silicate. Whether or not zinc or a zinc compound is contained in the protective layer 4, and its content in the layer can be confirmed by determination by a known analytical method such as XRF (fluorescent X-ray analysis), EPMA (X-ray microanalyser), XPS (X-ray photoelectron spectroscopy), ABS (Auger electron spectroscopy), and EDS (energy dispersion type fluorescent X-ray spectroscopy).

The thickness of the protective layer 4 in the rare earth magnet 1 preferably falls in the range of 0.01 to 10 μm, more preferably 0.1 to 3 μm. When the protective layer thickness is too small, corrosion resistance, especially water resistance, of the rare earth magnet 1 tends to decline. On the other hand, when the layer thickness is too large, the magnet body 1 becomes relatively small, assuming the size of the rare earth magnet 1 is fixed, and the desired magnetic properties may not be obtained. According to the protective layer 4 in the present embodiment of the present invention, satisfactory water resistance can be obtained if the layer has a thickness at least greater than the above-defined minimum value, so that better magnetic properties can be obtained in comparison with the case where it needs to form a protective layer of a thickness greater than specified above. In applications where importance is attached to corrosion resistance rather than magnetic properties, the protective layer 4 may have a greater thickness than the above-defined range.

While the present invention has been described with respect to a preferred embodiment, it is not necessarily limited to the embodiment described above, and it should be understood that variations and modifications thereof may be made without departing from the spirit and scope of the invention.

For instance, in the above-described embodiment, the treatment solution is prepared by adding a zinc compound to an alkali silicate solution, and stirring the mixed solution, but the order of operation is not limited to this pattern; it is possible to mix a zinc compound, an alkali silicate and water all at one time, and stir the mixture to prepare the treatment solution. Also, heating is not the only means for curing the treatment solution; curing can be effected as well by allowing the solution to stand for a given period of time after application.

EXAMPLES

The present invention will be described in further detail below with reference to the examples thereof, but the present invention is not limited to these examples.

Production of Rare Earth Magnet

Examples 1 to 6 and Comparative Examples 1 to 4

First, an ingot having the composition of 27.6 wt % Nd, 4.9 wt % Dy, 0.5 wt % Co, 0.4 wt % Al, 0.07 wt % Cu, 1.0 wt % B and the balance of Fe was made by a powder metallurgical method, and this ingot was crushed. Then the crushed material was subjected to jet mill grinding using an inert gas to obtain the fine powders having an average particle size of about 3.5 μm. The thus obtained fine powders were filled in a mold and molded in a magnetic field. Then the molding was sintered in vacuo and heat-treated to obtain a sintered body, and the sintered body was cut into a size of 20 mm×10 mm×2 mm to obtain a magnet body. This magnet body was degreased and then subjected to ultrasonic cleaning.

Meanwhile, #3 Sodium Silicate (produced by Fuji Kagaku Corp.), lithium silicate (Lithium Silicate 45 produced by Nissan Chemical Industries, Ltd.), a zinc compound and water were mixed in the various combinations and at the rates shown in Table 1 below and stirred to prepare the treatment solutions. Stirring was conducted at 25° C. for the periods shown in Table 1. No zinc compound was added in Comparative Example 1.

Each of the treatment solutions was applied on the magnet body to a coating thickness of 0.7 μm by dip spin coating and then heat-treated at 150° C. for 20 minutes to cure the treatment solution, thereby obtaining a rare earth magnet having a protective layer formed on the surface of the magnet body.

TABLE 1

| | Treatment solution composition (parts by weight) | | | | | | |
|---|---|---|---|---|---|---|---|
| | #3 Sodium silicate | Lithium silicate | Zinc compound | | Water | Stirring time (hr) | Turbidity (NTU) |
| Ex. 1 | 100 | 50 | Zinc sulfate heptahydrate | 2.00 | 17 | 48 | 2.6 |
| Ex. 2 | 100 | 0 | Zinc borate | 1.25 | 23 | 48 | 3.1 |
| Ex. 3 | 100 | 60 | Basic zinc carbonate | 0.77 | 18 | 46 | 4.5 |
| Ex. 4 | 100 | 30 | Zinc acetate dihydrate | 1.2 | 15 | 48 | 12.4 |
| Ex. 5 | 100 | 50 | Zinc nitrate hexahydrate | 1.8 | 17 | 48 | 9.3 |
| Ex. 6 | 100 | 20 | Zinc chloride | 0.64 | 14 | 48 | 8.6 |
| Com. Ex. 1 | 100 | 0 | — | 0 | 0 | — | 0.75 |
| Com. Ex. 2 | 100 | 0 | Zinc borate | 1.25 | 23 | 1 | >1000 |
| Com. Ex. 3 | 100 | 50 | Zinc hydroxide | 0.76 | 19 | 48 | >1000 |
| Com. Ex. 4 | 100 | 30 | Zinc phosphate tetrahydrate | 1.00 | 15 | 48 | 427 |

The rare earth magnets obtained in example 1 to 6 were fabricated to flake like shape by focused ion beam. The structure near the surface of these rare earth magnets was observed by transmission electron microscope (JEM-3010, manufactured by JEOL), then the distribution of elements contained in the protective layer were analyzed by EDS (VoyagerIII, manufactured by NoraanInstruments). As the result, it was not seen in protective layer that the domain formed by gathering zinc element have a width of 10 nm or more. Therefore, it was confirmed that zinc is dispersed uniformly in protective layer

[Evaluation of Characteristics]

(High Temperature, High Humidity Test)

The rare earth magnets of Examples b 1 to 6 and Comparative Examples 1 to 4 were subjected to a moisture resistance test by leaving each magnet in an atmosphere of 85° C. and 85% RH. After the test, each rare earth magnet was observed.

As a result, whitening of the film was seen in the magnet of Comparative Example 1 after the passage of 100 hours and rusting took place on the magnets of Comparative Examples 2, 3 and 4 after the passage of 240 hour, while no rusting was seen on the magnets of Examples 1 to 6 even after the lapse of 400 hours. The obtained results are shown collectively in Table 2.

(Adhesion Test)

An Al-made stud pin, 4.1 mm in diameter, was bonded to the surface of each of the rare earth magnets of Examples 1 to 6 and Comparative Examples 1 to 4 with an epoxy adhesive, and it was cured by heating. Each of the thus treated magnets was left in a 60° C. and 95% RH atmosphere for 24 hours and then subjected to a tensile test trying to separate the stud pin from the magnet.

As a result, none of the magnets of Examples 1 to 6 separated even under exertion of the force of 500 N while the magnet of Comparative Example 1 separated on exertion of 270 N, the magnet of Comparative Example 2 on exertion of 410 N, the magnet of Comparative Example 3 on exertion of 320 N and the magnet of Comparative Example 4 on exertion of 370 N. The obtained results are shown collectively in Table 2.

(Water Resistance Test)

Each of the rare earth magnets of Examples 1 to 6 and Comparative Examples 1 to 4 was immersed in 3 ml of 50° C. pure water for one hour, and the concentration of the silica component which eluted into the pure water was measured by the molybdenum blue method using Digital Pack Test-Multi (trade name, by Kyoritsu Chemical-Check Lab., Corp.). The obtained results are shown summarily in Table 2. The results show that the protective layer becomes more likely to be corroded with water and lowered in water resistance in accordance with the increase of the amount of elution.

TABLE 2

| | High temperature, high humidity test | Adhesive strength | Water resistance test (amount of silica eluted) |
|---|---|---|---|
| Ex. 1 | No rusting after 400 hours | >500 N | 20.4 ppm |
| Ex. 2 | No rusting after 400 hours | >500 N | 37.1 ppm |
| Ex. 3 | No rusting after 400 hours | >500 N | 14.9 ppm |
| Ex. 4 | No rusting after 400 hours | >500 N | 28.3 ppm |
| Ex. 5 | No rusting after 400 hours | >500 N | 24.5 ppm |
| Ex. 6 | No rusting after 400 hours | >500 N | 22.7 ppm |
| Com. Ex. 1 | Whitening after 100 hours | 270 N | 152 ppm |
| Com. Ex. 2 | Rusting after 240 hours | 410 N | 65.3 ppm |
| Com. Ex. 3 | Rusting after 240 hours | 320 N | 70.4 ppm |
| Com. Ex. 4 | Rusting after 240 hours | 370 N | 52.4 ppm |

As is seen from Table 2, the rare earth magnets obtained in Examples 1 to 6, as compared with Comparative Examples 1 to 4 in which the zinc compound was not or could not be dissolved sufficiently in the treatment solution, have high corrosion resistance with no rusting occurring in the high temperature and high humidity test, can provide excellent adhesiveness after the high temperature and high humidity treatments, and also show high durability even if immersed in water.

What is claimed is:

1. A rare earth magnet comprising a magnet body containing a rare earth element and a protective layer formed on the surface of the magnet body, wherein the protective layer contains an alkali silicate and at least one of zinc and a zinc compound, the zinc and/or the zinc compound are uniformly dispersed in the protective layer, the protective layer is obtained from a solution that has a turbidity of 100 NTU or below, and when the rare earth magnet is subjected to an adhesion test, the adhesion test being characterized by bonding an Al-made stud pin to the rare earth magnet, leaving the bonded rare earth magnet in a 60° C. and 95% RH atmosphere for 24 hours, and attempting to separate the stud pin from the rare earth magnet under an exertion of force of 500 N, the stud pin is not separated from the rare earth magnet.

2. The rare earth magnet according to claim 1, wherein zinc from the at least one of zinc and a zinc compound is present in the protective layer in an amount of 0.001 to 0.05 moles of zinc per mole of silicon in the alkali silicate.

3. The rare earth magnet according to claim 1, wherein the zinc compound is a zinc sulfate, a zinc borate, a basic zinc carbonate, a zinc acetate, a zinc chloride, or a zinc gluconate.

* * * * *